Dec. 22, 1970 R. H. HARNER 3,550,006

TEMPERATURE CONTROL FOR CRYSTAL OSCILLATOR AND MODULATION CIRCUIT OF A RADIO TRANSMITTER

Filed Jan. 17, 1968 4 Sheets-Sheet 1

3,550,006

TEMPERATURE CONTROL FOR CRYSTAL OSCILLATOR AND MODULATION CIRCUIT OF A RADIO TRANSMITTER

Robert H. Harner, Park Ridge, Ill., assignor to S&C Electric Company, Chicago, Ill., a corporation of Delaware Filed Jan. 17, 1968, Ser. No. 698,547
Int. Cl. H04b *1/02;* H03b *3/04*
U.S. Cl. 325—113 21 Claims

ABSTRACT OF THE DISCLOSURE

The operating temperature of the crystal oscillator and modulation circuit of a radio transmitter mounted on a high voltage electric power transmission line conductor is controlled to prevent unwanted shift in the carrier frequency and non-linearity in the modulation circuits.

Figure 1:
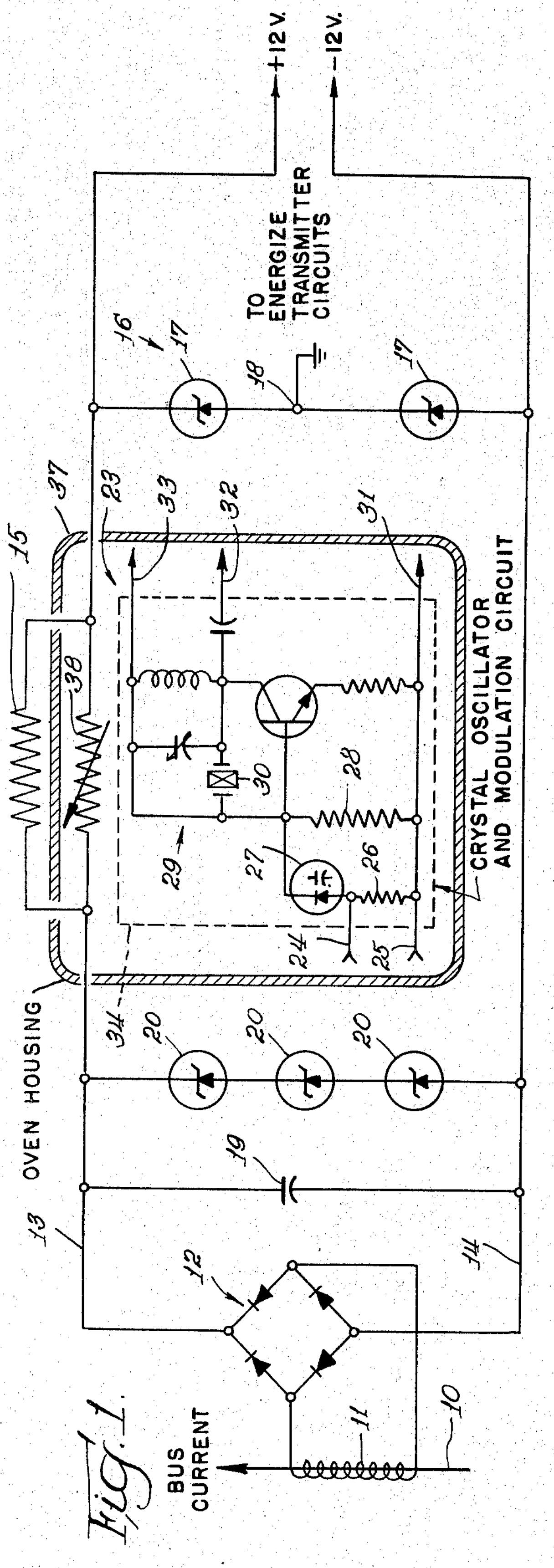

This invention is an improvement over the disclosure of Harner application Ser. No. 498,696, filed Oct. 30, 1965, now U.S. Pat. No. 3,460,042.

A radio transmitter, mounted on a high voltage transmission line conductor for operation at its potential and modulated in response to a variable, such as current flow in the conductor, is arranged to transmit to a remotely located radio receiver a signal which is the analog of such variable. The transmitter is subject to widely varying temperature conditions which are caused by externally applied solar heat and internally generated heat. The temperature may vary from −40° C. to +100° C. The transmitter should maintain stability and modulation linearity over this wide temperature range for the expected range of the variable to the end that the output of the radio receiver will accurately reflect the variable. However, the power employed for effecting the temperature control should not detract from the power used to energize the transmitter. This is of particular importance when the transmitter is modulated by curernt flow in the conductor and on flow of fault current when suddenly energizing the conductor, protective devices must be actuated.

Among the objects of this invention are: To provide for maintaining the operating temperature of the carrier frequency generating and controlling means of a radio transmitter mounted on a high voltage transmission line conductor; to control the operating temperature of the transmitter within a predetermined range of temperature to provide stability of the transmitter and modulation linearity for widely varying ambient temperature; to control the operating temperature without interfering with the energization of the transmitter when it is energized by current flow in the conductor; to accomplish this by positioning the carrier frequency generating and control means in a space the temperature of which is controlled to provide a predetermined ambient temperature therefor; to heat the space by current flow through heater means that is energized by power derived from current flow in the conductor; to employ for the heater means a resistance element the conductivity of which increases with decrease in ambient temperature and thereby is self-regulating; to connect the resistance element in parallel circuit relation with a resistance element the conductivity of which is substantially constant with respect to temperature change in order to provide for regulating the voltage at which the transmitter is energized by current flow in the conductor; to prevent energization of the heater means until the current flow in the conductor reaches a predetermined value; and to selectively connect a regulating resistor and heater means to energize the transmitter through either the resistor or the heater means in accordance with the temperature in the space occupied by the carrier frequency generating and controlling means.

According to this invention the temperature sensitive elements, such as the carrier frequency generating and controlling means, are positioned within an oven housing in which there is located heater means that is energized by power derived from current flow in the high voltage conductor. The heater means in some embodiments of the invention comprises resistance means the conductivity of which increases with decrease in ambient temperature and thus is self-regulating. In other embodiments it comprises resistance means the conductivity of which remains substantially constant with respect to temperature change and its energization is controlled in accordance with the temperature in the oven housing. In one embodiment the self-regulating resistance means is connected in parallel with the voltage regulating resistor to energize the transmitter as required with the power loss normally incurred in the voltage regulating resistor being used, in part, to energize the heater means. The energization of the heater means in some embodiments is delayed after predetermined current flows in the conductor in order to avoid time delay in energization of the transmitter.

Figure 2:
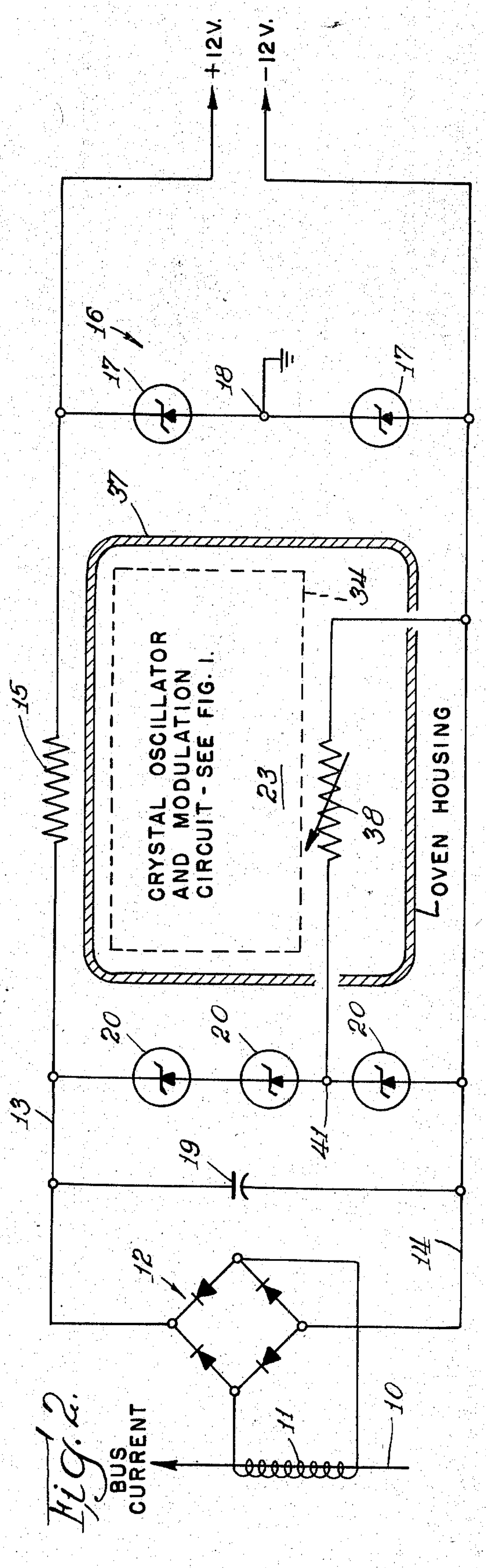
Figure 3:
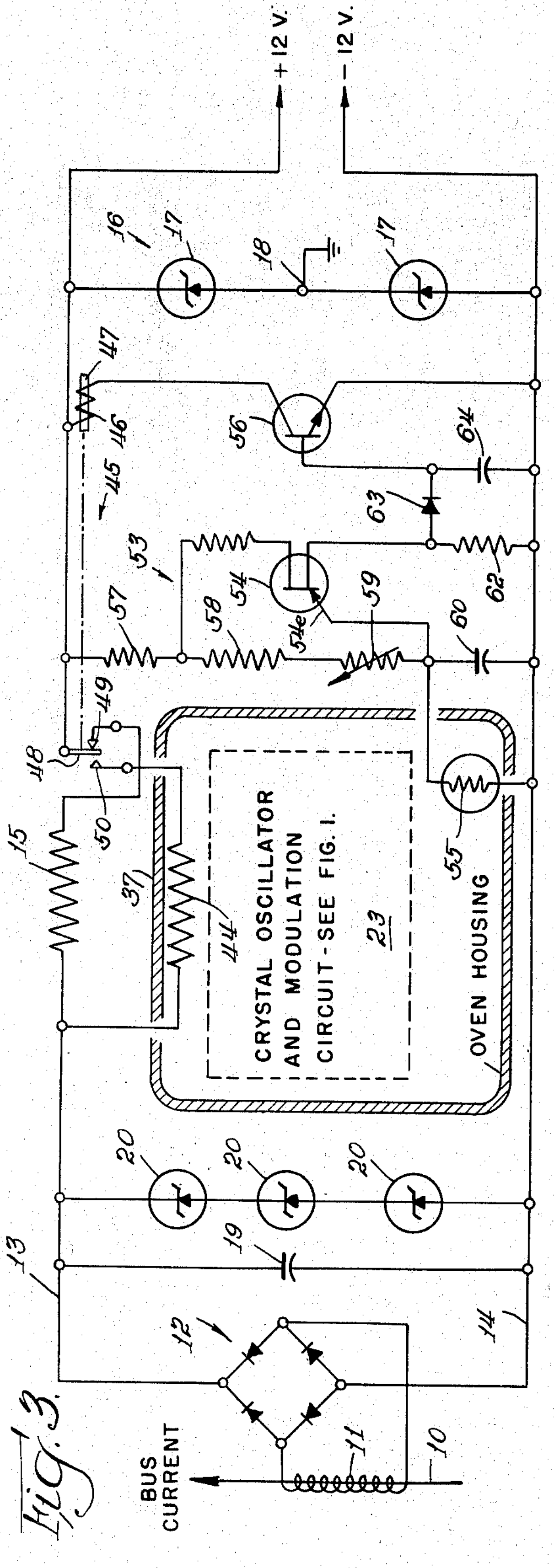
Figure 4:
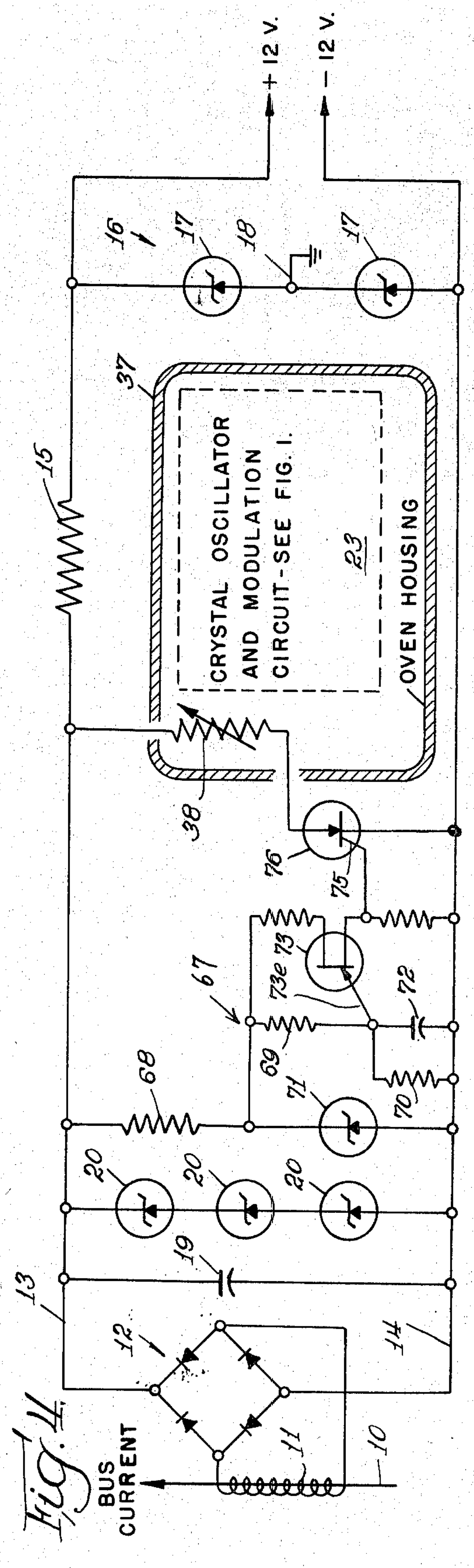
Figure 5:
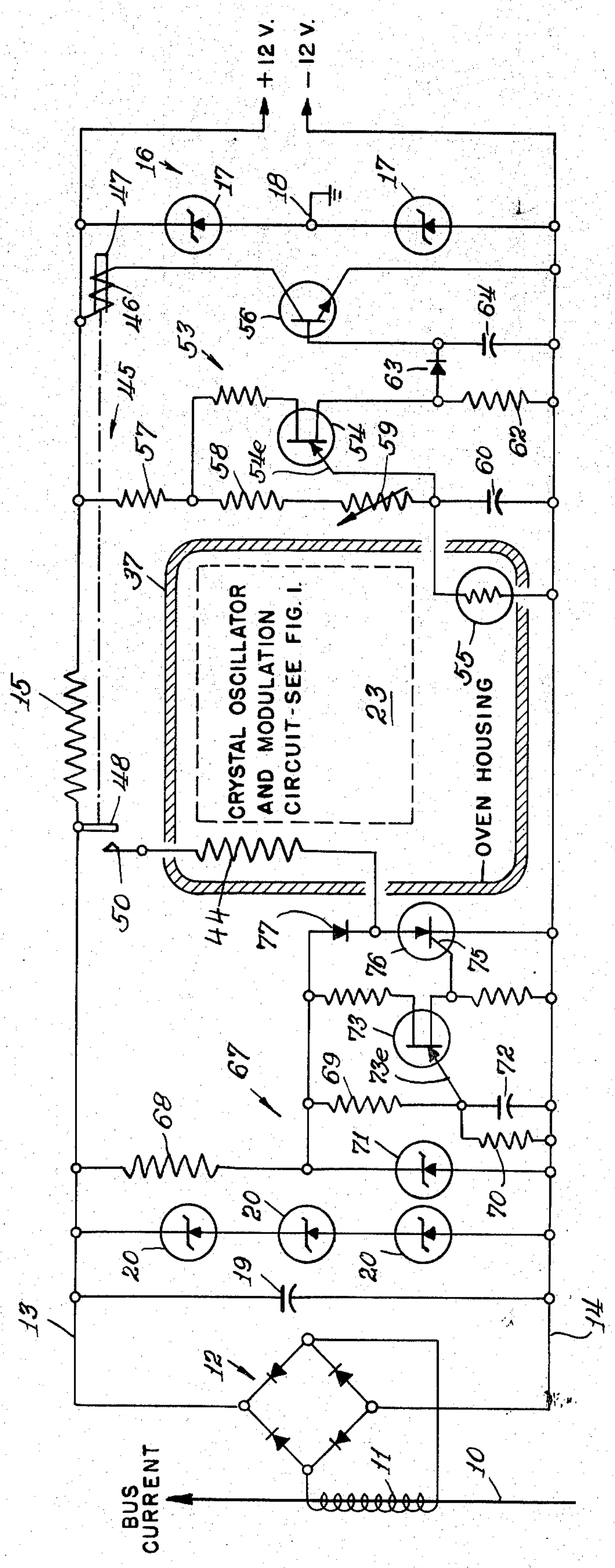
Figure 6:
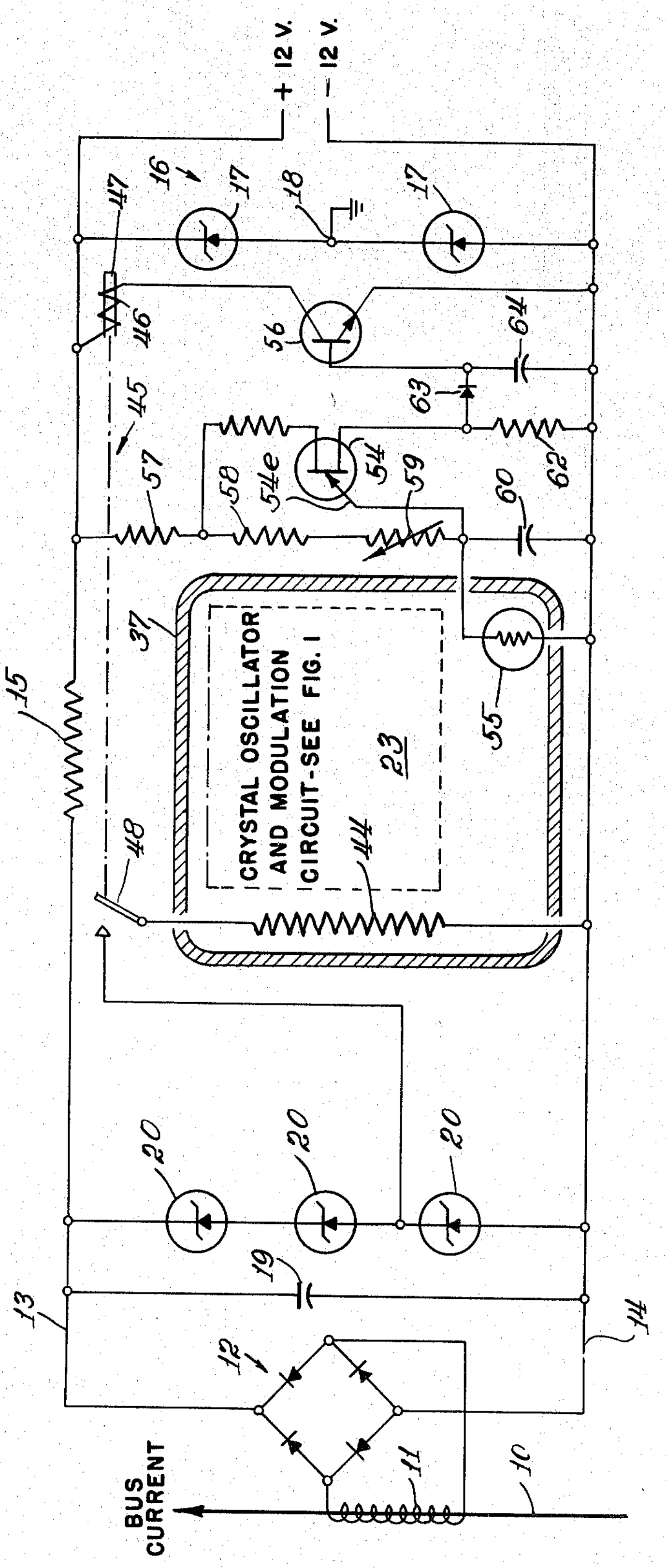

In the drawings: FIG. 1 illustrates, diagrammatically, the manner in which the operating temperature of the crystal oscillator and modulation circuit is maintained employing in an oven housing with a self-regulating heater means connected in parallel with a voltage regulating resistor having substantially constant resistance. FIG. 2 shows a modification of the circuit embodied in FIG. 1 in which the self-regulating heater means in the oven housing is connected for energization only after a predetermined current flows in the high voltage conductor. FIG. 3 shows another embodiment in which the transmitter is energized, as the result of current flow in the conductor, through either a voltage regulating resistor or heater means in the form of a resistor having substantially constant resistance in the oven housing under the control of temperature sensing means located in the housing. FIG. 4 illustrates an embodiment, similar to that shown in FIG. 2, in which a time delay control circuit is employed for delaying the energization of the self-regulating heater means in the oven housing for a predetermined time interval after the current flow in the conductor reaches a predetermined value. FIG. 5 illustrates how the temperature sensing means of FIG. 3 is employed in conjunction with the time delay circuit shown in FIG. 4. FIG. 6 shows the temperature sensing means of FIG. 3 for controlling the energization of constant resistance heater means after a predetermined current flows in the high voltage conductor.

In FIG. 1 the reference character 10 designates a high voltage electric power transmission line conductor which may be energized at various voltages ranging upwardly to 750 kv. In this embodiment the power supply circuits shown, for example, are arranged to be energized as a result of flow of alternating current such as 60 Hz. in the conductor 10. Associated with the conductor 10 is a secondary winding 11 into which voltage is induced which corresponds in magnitude to the current flow in the conductor 10. The output of the secondary winding 11 is connected to energize a full wave rectifier, indicated generally at 12, in order to maintain a direct voltage between conductors 13 and 14. A voltage regulating resistor 15 having a fixed resistance is connected in the conductor 13 to provide a regulated voltage output in conjunction with voltage regulating means indicated, generally, at 16 and illustrated by a pair of series connected Zener diodes 17 having a floating ground 18 therebetween. It will be understood that the voltage regulating means 16, as represented by the Zener diodes 17, provides suitable voltage regulating means for use in applying the necessary direct voltage for energizing the transmitter circuits of a radio transmitter that is mounted on the conductor 10 and is intended to operate at its potential. For illustrative purposes the voltage regulating means 16 is shown as being arranged to maintain substantially constant voltages of 12 volts positive and negative with respect to the ground 18. These voltages are maintained only on flow of predetermined current, for example 50 amperes or more, in the conductor 10. The current flow in the conductor 10 varies widely. For example the load current may range anywhere up to 4,000 amperes and short circuit current may be as high as 40,000 amperes. Therefore, the voltage regulating means 16 and associated equipment are required to accommodate a wide range of operating conditions and also to maintain the voltages for energizing the transmitter circuits substantially constant. A part of the regulating means includes a capacitor 19 connected directly between the conductors 13 and 14 and across the output terminals of the full wave rectifier 12 and the voltage limiting series connected Zener diodes 20. The Zener diodes 20 individually are arranged to conduct on application thereto of a predetermined voltage, for example 20 volts. Thus the three Zener diodes 20 are arranged to become conducting in the event that voltage between the conductors 13 and 14 exceeds 60 volts.

The radio transmitter is arranged to be controlled by a crystal oscillator and modulation circuit that is indicated, generally, at 23 and located in an oven housing to be described. A sub-carrier oscillator, which also requires temperature stability, can be placed in the oven housing instead of the particular circuit 23. It will be understood that the present invention can be employed in conjunction with any carrier frequency generating and/or control means that requires temperature stability to maintain accurate transmission of the variable that modulates the transmitter. Here the transmitter is of the frequency modulation type in which a carrier frequency is generated and is varied as a function of the current flow in the conductor 10. The crystal oscillator and modulation circuit 23 includes conductors 24 and 25 which are connected to the modulating source that, in the present instance, is a function of the current flow in the conductor 10. The modulating input voltage is applied across a resistor 26 which is connected in series with a varactor 27 the capacitance of which varies as a function of the modulating voltage. The resistor 26 and varactor 27 are connected in shunt with a resistor 28 and the combination is connected to an oscillation circuit that is indicated, generally, at 29. The oscillation circuit 29 includes a crystal 30 which determines the carrier frequency of the radio transmitter. One side of the oscillation circuit 29 is connected to conductor 31 which in turn is connected to a floating ground, such as the ground 18. A conductor 32 connects the oscillation circuit 29 to a transmitter output driver circuit and conductor 33 connects the oscillation circuit 29 to the power supply of the transmitter circuits. Preferably the crystal oscillator and modulation circuit 23 is enclosed in a suitable encapsulation as indicated by broken line outline 34.

For proper operation of the radio transmitter the frequency generated by the crystal oscillator and modulation circuit 23 or other carrier frequency generating and/or control means must remain substantially unaffected by change in ambient temperature. One reason for this is to insure that the output of the radio transmitter is an accurate and linear function only of the modulating voltage input as reflected from a variable such as the current flow in the conductor 10. Another reason is to maintain the stability of the transmitter at its center operating frequency in order that the transmitter and receiver center frequencies are identical. In accordance with this invention the crystal oscillator and modulation circuit 23, suitably encapsulated, is positioned in an oven housing 37 that is formed of good insulating material. Alternatively, the oven housing 37, with suitable insulation, can be formed of metal. In the embodiment shown in FIG. 1 heater means 38 is employed in the oven housing 37 and is connected in parallel circuit relation with the voltage regulating resistor 15. This arrangement makes it possible to use certain of the resistance characteristics of the heater means 38 in conjunction with the voltage regulating resistor 15 for the purpose of absorbing some of the energy from the full wave rectifier 12 in regulating the voltage applied to the voltage regulator means 16. For example, the heater means 38 can be self-regulating and formed of a suitable resistance material which varies from the value of 200 ohms at −40° C. to 2,000 ohms at +100° C. The substantially invariable resistance of the voltage regulating resistor 15, for illustrative purposes, may be 400 ohms. The range in resistance of the parallel connected resistors 15 and 38 is from 133 ohms at −40° C. to 330 ohms at +100° C. This range in resistance is adequate to provide for proper regulation of the voltage applied to the voltage regulating means 16 for energizing the transmitter circuits at the necessary operating voltage. By utilizing the resistance of the heater means 38 in combination with the resistance of the voltage regulating resistor 15 it is possible to provide the necessary power for maintaining the crystal oscillator and modulation circuit 23 at the desired operating temperature without unduly burdening the output of the secondary or power supply winding 11 which is also employed for energizing the transmitter circuits.

In FIG. 2 there is illustrated a modification of the system shown in FIG. 1. Here the heater means 38 in the form of a self-regulating resistance element is connected for energization between conductor 14 and intermediate connection 41 between two of the voltage limiting Zener diodes 20. On initial flow of current in the conductor 10, sufficient voltage is not developed between conductors 13 and 14 to cause current to flow through the voltage limiting Zener diodes 20. Accordingly, the heater means 38 in the oven 37 is not energized and the entire output of the full wave rectifier 12 is applied through the voltage regulating resistor 15 to the voltage regulating means 16. The transmitter circuits then are energized with the minimum of time delay. This is particularly desirable when current flow is suddenly initiated in the conductor 10 or the current flow rises to the threshold value at which time the transmitter circuits should be energized without any further time delay. By connecting the heater means 38 as shown in FIG. 2 and described above the heater means 38 is not energized until the voltage between conductors 13 and 14 reaches 60 volts. No additional energy is required from the secondary winding 11 during this period and the operation of the transmitter is not interfered with. When the voltage between conductors 13 and 14 rises sufficiently to cause current to flow through the Zener diodes 20, a part of this current is shunted through heater means 38 and it is energized to function in the manner previously described.

In FIG. 3 the temperature within the oven housing 37 is maintained by heater means 44 in the form of a resistance element the resistance of which is substantially constant with respect to temperature. For example, it may have the same resistance characteristic as voltage regulating resistor 15. Provision is made for alternately connecting the voltage regulating resistor 15 or the heater means 44 in the circuit between the full wave rectifier 12 and the voltage regulating means 16 in accordance with the temperature within the oven housing 37. For this purpose a switching means in the form of a magnetic type relay, indicated generally at 45, is employed having a winding 46 for attracting an armature 47 that is connected to a movable contact 48 which is arranged to shift the energizing circuit for the voltage regulating means 16 between a contact 49 which is connected to the voltage regulating resistor 15 and a contact 50 which is connected to the heater means 44. The arrangement is such that the movable contact 48 engages contact 50 before it disengages contact 49 and vice versa. Thus the energizing circuit for the voltage regulating means 16 is not opened at any time.

For controlling the relay 45 an oven temperature sensing circuit, indicated generally at 53, is employed. It includes a unijunction transistor 54, oven temperature responsive means 55 in the form of a thermistor located within the housing 37 and a switching transistor 56 which is connected to the winding 46. The oven temperature responsive means 55 is connected in series circuit relation with series connected resistors 57 and 58 and a variable resistor 59. Shunted across the oven temperature resistance means 55 is a capacitor 60. A decrease in temperature within the oven housing 37 causes an increase in resistance of the oven temperature responsive means 55 and increases the voltage applied to capacitor 60. The emitter 54*e* of the transistor 54 is connected to the junction between variable resistor 59 and capacitor 60 and the transistor 54 is caused to oscillate to produce an output through resistor 62. The voltage drop across resistor 62 is rectified by a diode 63 and filtered by a capacitor 64. This rectified output is applied to the base of the switching transistor 56 which is rendered conducting to energize winding 46 and shift the contact 48 from engagement with contact 49 to engagement with contact 50. This effects transfer of the energizing circuit from the voltage regulating resistor 15 to the heater means 44 in the housing 37. When the voltage between the conductors 13 and 14 is lowered due to reduced current in conductor 10, the transistor 54 ceases to conduct and biasing voltage is removed from the switching transistor 56. Winding 46 is deenergized as a result of the switching transistor 56 ceasing to conduct and movable contact 48 engages contact 49 and disengages contact 50 to maintain the energization of the voltage regulating means 16. Therefore, at low current levels the heater means 44 is not energized and the transmitter turn on is not affected. When the temperature in the oven 37 increases, the resistance of the oven temperature responsive means 55 decreases and reduces the voltage applied to capacitor 60. Transistor 54 ceases oscillating and transistor 56 ceases to conduct. The winding 46 is deenergized and movable contact 48 is shifted from the contact 50 to contact 49.

FIG. 4 shows a system for energizing the voltage regulating means 16 independently of the energization of the self-regulating heater means 38 in the oven housing 37. Provision is made for employing a time delay control circuit, indicated generally at 67, for delaying the energization of the heater means 38 until a predetermined voltage exists between conductors 13 and 14. Thus there is no delay in the energization of the voltage regulating means 16 and the transmitter circuits are energized in turn without any delay. Subsequently, on the application of a predetermined voltage between conductors 13 and 14, the time delay control circuit 67 permits energization of the heater means 38 and thus prevents any interference with the application of energizing voltage to the transmitter circuits during the initial start up period.

The time delay control circuit 67 in FIG. 4 includes voltage dividing resistors 68, 69 and 70 that are connected in series circuit relation. A voltage limiting Zener diode 71 is connected across the resistors 69 and 70 to provide a constant supply voltage to the time delay control circuit 67. The timing circuit includes a capacitor 72 which is connected in shunt with the resistor 70 to provide an RC circuit for controlling the operation of a unijunction transistor 73. The emitter 73*e* of the transistor 73 is connected to the common connection between the resistor 69 and capacitor 72. After an interval determined by the resistor 70 and capacitor 72 the voltage applied to the emitter 73*e* is sufficient to cause the transistor 73 to oscillate. Its output is applied to a gate 75 of switching means in the form of a silicon controlled rectifier 76 which is rendered conducting through the heater means 38. This occurs after the operation of the transmitter is stabilized. On reduction or loss of voltage between conductors 13 and 14 due to current in the conductor 10 falling below a predetermined level or to zero, the transistor 73 stops oscillating, the silicon controlled rectifier 76 ceases to conduct and the heater means 38 is deenergized. The power supply circuit therefore is not loaded by the heater means 38 at low current levels nor is the transmitter delayed in being turned on.

FIG. 5 illustrates circuit connections which combine certain features of the systems illustrated in FIGS. 3 and 4. Here the heater means 44 has a substantially constant resistance with respect to temperature. The relay 45 is modified to employ only the movable contact 48 and the contact 50. They are arranged to connect the heater means 44 for energization across the conductors 13 and 14 through the silicon controlled rectifier 76 only after the time delay control circuit 67 has functioned in the manner above described. The silicon controlled rectifier 76 is maintained conducting through a diode 77 and a resistor 68 even when contact 60 is open as long as sufficient voltage is maintained between conductors 13 and 14 and regardless of whether sufficient voltage is available to cause transistor 73 to oscillate. Once the heater means 44 has been energized, the temperature within the housing 37 is controlled by the oven temperature sensing circuit 53 and relay 45 in the manner above outlined. On loss of voltage between conductors 13 and 14 transistor 73 ceases to oscillate, the silicon controlled rectifier 76 ceases to conduct and the heater means 44 is no longer energized.

FIG. 6 combines certain features of the circuits illustrated in FIGS. 2 and 5. In FIG. 6 the substantially constant resistance heater means 44 is connected for energization across one of the diodes 20 for the purpose of preventing its energization until the current flow in the conductor 10 is increased to a value such that the series connected diodes 20 become conducting. Then the oven temperature sensing circuit 53 takes over the control of the movable contact 48 to energize and deenergize heater means 44 in the manner previously described.

In each of the embodiments disclosed the oven housing 37 is of minimum size consistent with the requirement that it enclose those temperature sensitive elements which control the output of the radio transmitter mounted on conductor 10. Only a relatively small amount of power is required to heat the space within the housing 37 and this can be diverted in the manners described from the secondary winding 10 without interfering with the proper energization of the transmitter circuits. Also the insulation of the oven housing 37 is such as to maintain the temperature of the components enclosed therein at the regulated temperature on loss of the power supply from the secondary winding 11 for normal short periods of time. Since accuracy of the transmitter at low current flow in the conductor 10 is not critical, it is of no particular concern that power is not applied within the oven housing 37 under such operating conditions. It will be understood that the various circuits and combinations of circuits disclosed herein are illustrative of those that can be employed for the purposes here outlined.

What is claimed as new is:

1. In a radio transmitter for mounting on and operation at the potential of a high voltage electric power transmission line conductor and subject to a wide range of ambient temperature means responsive to current flow in said conductor for energizing said radio transmitter, means for controlling a carrier frequency that is subject to changes which result in an unwanted shift in said carrier frequency due to temperature change, and
means for maintaining the operating temperature of said carrier frequency controlling means within a predetermined temperature range, said temperature maintaining means include
a housing enclosing said carrier frequency controlling means, and
heater means in said housing controlled in accordance with the magnitude of said current flow in said transmission line conductor.

2. The radio transmitter, as set forth in claim 1 wherein means control said heater means in accordance with the temperature in said housing.

3. The radio transmitter, as set forth in claim 1, wherein said heater means comprises a resistance element the conductivity of which increases with decrease in ambient temperature.

4. The radio transmitter, as set forth in claim 3, wherein there is connected in parallel circuit relation with said resistance element another resistance element the conductivity of which is substantially constant over said predetermined temperature range whereby the effective resistance of the parallel connected resistance elements is maintained within a predetermined range of resistance and the voltage for energizing said transmitter is maintained within a predetermined range of voltage.

5. The radio transmitter, as set forth in claim 3, wherein means prevent energization of said heater means until said current flow in said transmission line conductor is increased to a predetermined value.

6. The radio transmitter, as set forth in claim 3, wherein time delay means prevent energization of said heater means until the expiration of a predetermined interval after the current flow in said transmission line conductor reaches a predetermined level.

7. The radio transmitter, as set forth in claim 6, wherein said time delay means include switching means to connect said heater means for energization from said current flow.

8. The radio transmitter, as set forth in claim 5, wherein said means preventing energization of said heater means includes a plurality of series connected devices connected to be responsive to a voltage that varies according to the magnitude of said current flow and said heater means is connected across less than all of said series connected devices.

9. The radio transmitter, as set forth in claim 1, wherein means prevent energization of said heater means until said current flow in said transmission line conductor is increased to a predetermined value.

10. The radio transmitter, as set forth in claim 9, wherein said means preventing energization of said heater means includes a plurality of series connected devices connected to be responsive to a voltage that varies according to the magnitude of said current flow and said heater means is connected across less than all of said series connected devices.

11. The radio transmitter, as set forth in claim 1, wherein said heater means comprises a resistance element the resistance of which is substantially invariable with change in temperature.

12. The radio transmitter, as set forth in claim 11, wherein time delay means prevent energization of said heater means until the expiration of a predetermined interval after the current flow in said transmission line conductor reaches a predetermined level.

13. The radio transmitter, as set forth in claim 11, wherein means prevent energization of said heater means until said current flow in said transmission line conductor is increased to a predetermined value.

14. The radio transmitter, as set forth in claim 11, wherein
switching means is arranged to connect said heater means for energization from said current flow, and
means responsive to temperature in said housing control operation of said switching means.

15. The radio transmitter, as set forth in claim 14, wherein means prevent energization of said heater means until said current flow in said transmission line conductor is increased to a predetermined value.

16. The radio transmitter, as set forth in claim 1, wherein
switching means is arranged to connect said heater means for energization from said current flow, and
means responsive to temperature in said housing control operation of said switching means.

17. The radio transmitter, as set forth in claim 16, wherein
means prevent energization of said heater means until said current flow in said transmission line conductor is increased to a predetermined value.

18. The radio transmitter, as set forth in claim 11, wherein
another resistance element is provided having substantially the same resistance characteristics as said heater means,
switch means is arranged to shift energizing connections from one resistance element to the other, and
means responsive to temperature in said housing control operation of said switching means.

19. The radio transmitter, as set forth in claim 1, wherein time delay means prevent energization of said heater means until the expiration of a predetermined interval after the current flow in said transmission line conductor reaches a predetermined value.

20. The radio transmitter, as set forth in claim 19, wherein said heater means comprises a resistance element the conductivity of which increases with decrease in ambient temperature.

21. The radio transmitter, as set forth in claim 19, wherein
switching means is arranged to connect said heater means for energization from said current flow, and
means responsive to temperature in said housing control operation of said switching means.

References Cited

UNITED STATES PATENTS

| | | | |
|---|---|---|---|
| 2,975,261 | 3/1961 | Keen et al. | 331—69UX |
| 3,197,702 | 7/1965 | Schweitzer, Jr. | 325—113UX |
| 3,242,429 | 3/1966 | Akerman, Jr. et al. | 325—113 |
| 3,275,892 | 9/1966 | Schweitzer, Jr. | 325—113 |
| 3,322,982 | 5/1967 | Craiglow et al. | 331—69 |

ROBERT L. GRIFFIN, Primary Examiner

J. A. BRODSKY, Assistant Examiner

U.S. Cl. X.R.

325—119, 150, 184; 331—69